Sept. 23, 1958  D. J. ZAFFARANO ET AL  2,853,237

SCANNER FOR EXPOSING AND ANALYZING MULTI-CHANNEL FILM

Filed June 8, 1954  6 Sheets-Sheet 1

FIG. 1

INVENTORS
Daniel J. Zaffarano
John Weber, Jr.
Wayne A. Rhinehart
BY:
ATTORNEY

FIG. 4

INVENTORS
Daniel J. Zaffarano
John Weber, Jr.
Wayne A. Rhinehart
BY:
ATTORNEY

Sept. 23, 1958 D. J. ZAFFARANO ET AL 2,853,237
SCANNER FOR EXPOSING AND ANALYZING MULTI-CHANNEL FILM
Filed June 8, 1954 6 Sheets-Sheet 5

INVENTORS
Daniel J. Zaffarano
John Weber, Jr.
Wayne A. Rhinehart
BY:
ATTORNEY

United States Patent Office 2,853,237
Patented Sept. 23, 1958

2,853,237

SCANNER FOR EXPOSING AND ANALYZING MULTI-CHANNEL FILM

Daniel J. Zaffarano, John Weber, Jr., and Wayne A. Rhinehart, Ames, Iowa, assignors to the United States of America as represented by the United States Atomic Energy Commission Application June 8, 1954, Serial No. 435,388

11 Claims. (Cl. 235—61.11)

The present invention relates to pulse height analysis systems and in particular to a multi-channel pulse height analysis system utilizing a photographic recording on a moving film for obtaining quantitative amplitude distribution data of electrical pulses.

Pulse height analysis is ordinarily employed to determine the number of pulses occurring in some physical phenomenon as well as determining the amplitude of each pulse for the purpose of measuring energy output. Pulse height analysis is employed in various fields, particularly in scintillation and proportional counter spectroscopy. Recent advances in the detection and counting of particles and quanta by the use of scintillation crystals, together with photomultiplier tubes and fast amplifiers, have made detection and analysis of particles from nuclear reactions possible at high speeds and with improved collection efficiencies. The shorter time duration of the voltage pulses has allowed further discrimination against spurious events. The proportionality between the pulse height and the energy of the incident particle in most cases has made an amplitude analysis of the pulses obtained useful for determining the energy spectrum of the radiation with a fair degree of resolution. Pulse height analysis is often accomplished with (1) a single channel differential discriminator with which a "window" of width $\Delta E$ is moved over the range of interest, or with (2) multi-channel assemblies which maintain "windows" at many preset heights and divert the acceptable counts in each channel to tabulators. The latter system has the advantage of efficient use of available information, but the disadvantage of complexity and cost. The use of the moving film to record pulses as displayed on the cathode ray oscilloscope is not new. Up to now, a record showing the entire trace of the oscilloscope spot for each event has usually been obtained necessitating, however, the use of a large quantity of film.

Up to the present time, the summation of events as recorded on the films was made visually by utilizing a film viewer. This required the use of several people to compute the number of events in each channel if the analysis was required in a relatively short time. For instance, a period of 20,000 events could be tabulated by two observers in about four hours. Another disadvantage, in using the human element, was the error produced by the personnel counting the events on the film because the viewing and totalizing work was rather tedious and tiring to the eyes of the observers.

An object of the invention is to provide a film scanning machine to count and tabulate the number of events recorded on a film with a negligible error.

Another object of the invention is to provide a film guide adapted to control the lateral movement of the film during its longitudinal scanning movement from one reel to another reel to reduce error caused by reference base fluctuation.

Further objects and advantages of this invention will become apparent in the invention and will be better understood by reference to the following description in conjunction with the accompanying drawing comprising several figures.

According to the pulse analyzer system for which this invention has been devised, a pulse shaping circuit is used to pretreat the pulses (originating in some physical phenomenon and converted to pulses by other means such as scintillation detectors) of varying heights to convert them proportionally into flat top pulses of a few microseconds total duration. An intensifying gate is applied momentarily during the midportion of the pulse to the Z-axis of the oscilloscope, resulting in only a portion of the top of the pulse being visible on the oscilloscope screen when the intensity is properly adjusted. Thus, with a slow sweep, the spectrum of pulses is represented by dots on the oscilloscope screen, the departure of each dot from the base line being proportional to the amplitude of the incident pulse. These dots are then recorded on a film moving past the face of the cathode ray tube. After the film has been processed, it is inserted into a scanner, the subject of this invention, which scans a plurality of linear channels comprising the width of the film. A scaler counts the number of events that have been scanned in each channel and by means of a converter impresses proper electrical signals on a recorder for recording the data tabulated by the scaler for each channel scanned. Since each channel occupies a certain energy level band depending on its displacement from the reference base, the relative total intensity of spectra can be computed by counting the number of dots in each channel, and then totaling the number of dots in all channels.

In the electrical control system to be later described, a direct current signal from a photomultiplier tube is used for control purposes. However, a capacitor is used to couple the pulse signal generated by a (moving) dot on a moving film from the photomultiplier tube output to the pulse height discriminator and pulse shaper unit. This has the advantages of minimizing the effect of dust particles and film density variations, as the pulse height discriminator circuit is adjusted to respond only to pulses of a given shape and duration. Hence anything but a dot of proper proportions is not likely to give the proper kind of a pulse to register the event.

Figure 1:
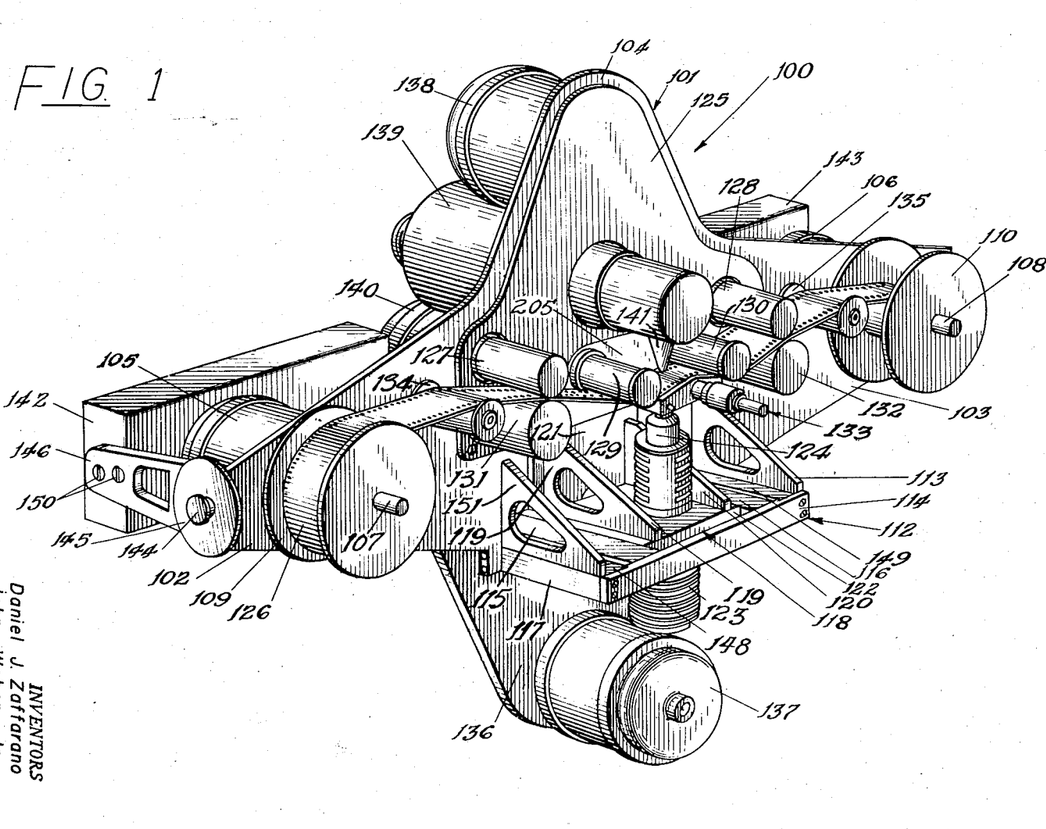
Fig. 1 is a perspective view of a scanning machine employed in the pulse analyzer briefly described hereinbefore.

Referring to Fig. 1, the film scanning machine 100 comprises a supporting plate 101 having two arms 102 and 103 and an apex 104. On its arm 102, hereafter called the left arm, a take-up motor 105 is permanently mounted. Similarly, a take-up motor 106 is mounted on the arm 103. An output shaft 107 on the take-up motor 105 extends through the arm 102 and supports a take-up reel 109. Similarly, an output shaft 108 of the take-up motor 106 extends through the arm 103 and supports a take-up reel 110. A reversing motor 138 is mounted on the supporting plate 101 near the apex 104.

A carriage support 112 is attached to the supporting plate 101 by suitable means. The carriage support 112 comprises side plates 151 and 113, a front plate 114, channel guides 115 and 116, and bottom plates 148 and 149. The side plates 113 and 151 are mounted on the supporting plate 101. To the bottom of the side plate 151, a bottom plate 117 is attached thereto. Similarly, another bottom plate, which is not visible in this figure, is attached to the side plate 113. The bottom plate 117 is also attached to the supporting plate 101. The extremities of the bottom plates are cooperatively held together by means of a front plate 114. The carriage support 112 serves as a means of support for a carriage assembly 118 which comprises a pair of side plates 119 and 120 mounted in a vertical position to a back plate 121. The side plates 119 and 120 are also mounted to a carriage bed 122 which also is mounted to the back plate 121. Mounted on the carriage bed 122, is a light source housing 123 which extends through an opening in the carriage bed 122 and has a lens tube 124.

Mounted on the supporting plate 101 and extending through various openings in a cover plate 125, there are a series of rollers. A pair of film-guide rollers 129 and 130 are used to position a film strip 126 over the lens tube 124 and then a pair of pressure rollers 127 and 128 also extends through the cover plate 125. A pair of drive rollers 131 and 132 extends through both the supporting plate 101 and the cover plate 125. The pressure and the drive rollers cooperate together to feed the film strip in a desired direction of feed. A film-guide assembly 133 is mounted slightly below the film-guide rollers 129 and 130 and in center thereof to cooperate therewith in keeping the film strip positioned over said film-guide assembly. Situated adjacent to the take-up reel 109 is film-guide roller 134 and similarly situated adjacent to the take-up reel 110 is film-guide roller 135. These film-guide rollers guide the film strip 126 onto their associated take-up reels. A motor support plate 136 is mounted in a vertical plane parallel to the supporting plate 101 by means which will be shown hereinafter. The motor support plate 136 serves as a means for mounting a channel-drive motor 137 and a main drive motor 140.

Extending through an opening which is common to both the supporting plate 101 and the cover plate 125 is a photomultiplier tube housing 139. A plastic light guide 141 is cemented directly to a photomultiplier tube with material of proper index of refraction to minimize light loss, for the purpose of channeling through the photomultiplier tube housing 139 the light received from the lens tube 124. An opaque coating on the outside of said light guide 141 excludes extraneous light from the photomultiplier tube, so that the scanning apparatus may be operated in a normally illuminated room.

The supporting plate 101 and the motor support plate 136 are mounted by suitable means to a pair of terminal panels 142 and 143. As indicated in Fig. 1, the arm 102 of the supporting plate 101 is attached to the terminal plate 142 by means of a support lug 144, an end plate 145, a terminal support 146 and the screws 150. The other arm of the supporting plate 101 is attached by similar means to the terminal panel 143.

The film strip 126 which is wound on the take-up reel 109 is inserted between the various rollers and film guides so that it traverses the film-guide assembly 133 and then it passes through the other set of rollers and film guides to be wound on the take-up reel 110. A very small aperture, usually 0.005 inch in diameter, located within the light source housing 123, is illuminated by a lamp located immediately behind it. This aperture is focused, at unity magnification, on the film being scanned. The spot of light used for scanning the film is therefore 0.005 inch in diameter, approximately the size of the dots on the film being scanned. The lamp located within the light source housing 123 passes a beam of light through the lens tube 124, through a slot in the film-guide assembly 133, through the film strip 126, and then through the light guide 141 onto the photomultiplier tube found within the housing 139.

Figure 2:
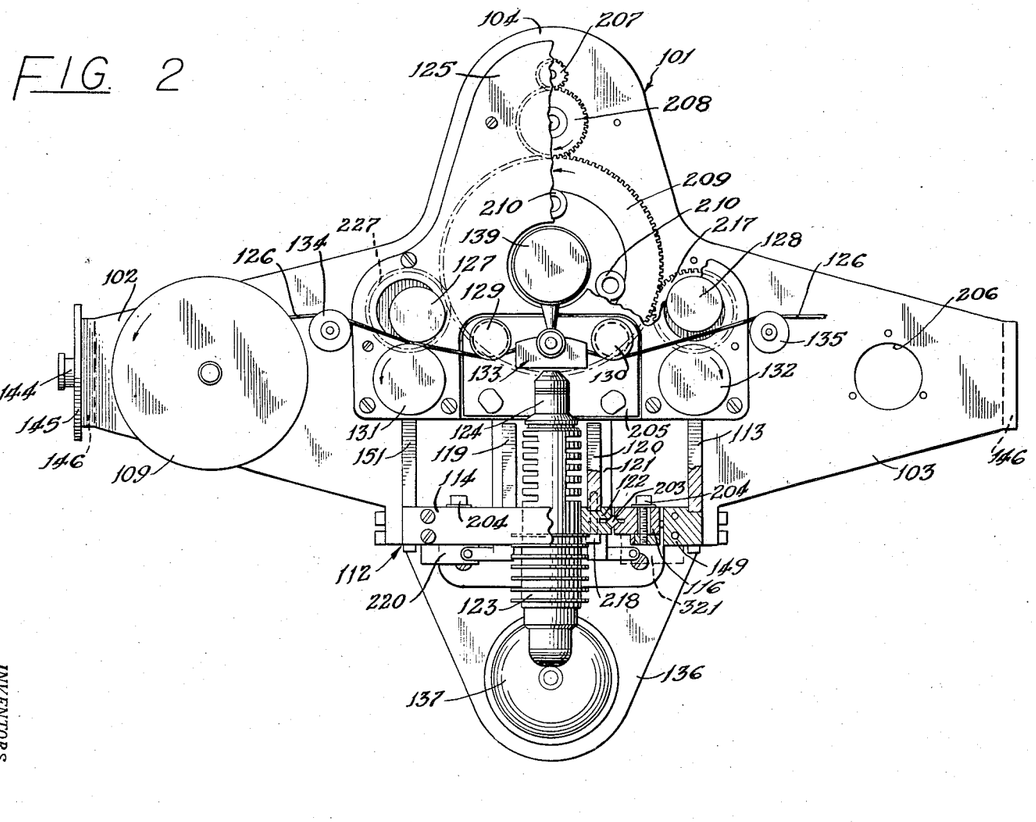
Fig. 2 is a front view of the scanning machine.

The front view of the film-scanning machine is shown in Fig. 2. Part of the cover plate 125 has been removed to expose to view the gears that enter into the reversing gear train which comprises a driver gear 207, gear 208, and gear 209. The driver gear 207 and the gear 208 are mounted on individual shafts. The gear 209 is an annular gear which, for means of rotational support, uses three gear retainers such as indicated by 210. The inner rim of the gear 209 is in intimate contact with the gear retainers 210 and imparts stability to the gear. The gear 209 engages in contact with a gear 217, which is exposed to view, and also with a gear, which pitch circle is indicated by the dotted circle 227. The gear 217 is mounted concentrically on a shaft which is not visible in the view. The pressure roller 128 is mounted eccentrically on the same shaft which supports the gear 217. The pressure roller 127 is similarly mounted. As shown in Fig. 2, the drive roller 131 rotates counterclockwise so that the film strip 126 between the pressure roller 127 and the drive roller 131 is fed to the left side of the film-scanning machine. The pressure is applied by the pressure roller 127, the sprocket holes in the film strip 126 are not used for propulsion purposes. The pressure rollers are spring loaded so that binding does not occur between the cooperating rollers. The pressure roller 128, is not at the present time, in pressure contact with the drive roller 132 thereby allowing free passage to the film strip found therebetween.

The function of the reversing gear train is as follows:

After the reversing strip (which will be described later) of the film 126 is reached, the reversing motor 138, which drives the driver gear 207, will become energized and actuate the gear train so that the gear 209 will rotate counterclockwise causing the gear 227 represented by the dotted circles to rotate the shaft on which it is permanently mounted thereby causing the pressure roller 127, which is also mounted on the same shaft, to swing eccentrically in a clockwise direction. At the same time, the gear 217 will turn clockwise thereby revolving the pressure roller 128 eccentrically in a clockwise direction causing it to descend and come into pressure contact with the driver roller 132 with the film strip 126 therebetween. As a result, the direction of film feed will be reversed from the left side to the right side of the scanning machine.

The film-guide assembly 133 is mounted on a film-guide base 205 which in turn is mounted on the support plate 101 with adjustable spacing screws (not shown). The side plates 113 and 151 are fastened by appropriate means to the supporting plate 101. The bottoms of these side plates are fastened to bottom plates. This can be easily discerned from a partial cross section view which reveals the attachment of the side plate 113 to a bottom plate 149. Adjacent to the bottom plate 149 is a channel guide 116 which has slots extending vertically therein for the introduction of adjustment screws 204 for the purpose of varying the position of the channel guide 116 in the horizontal plane. A similar construction is used for the other side of the scanning machine.

Adjacent to the channel guide 116 is the carriage bed 122, as shown in the view. A pair of horizontal slots is found in the sides adjacent to each other of the channel guide 116 and the carriage bed 122 so that a bearing square rod 203 may be introduced between said slots to allow a sliding movement of the carriage bed 122 in a horizontal plane perpendicular to the face of the drawing. The carriage bed 122 is secured on both sides, by suitable means, to the side plates 119 and 120. As an example, a bolt 218 fastens the side plate 120 to the carriage bed 122. The side plates 119 and 120 are also attached to the back plate 121. A take-up reel has not been shown on the right side of the scanning machine so that the opening 206, which is used for the purpose of passing through an output shaft from the take-up motor mounted behind the arm 103, may be shown.

Figure 3:
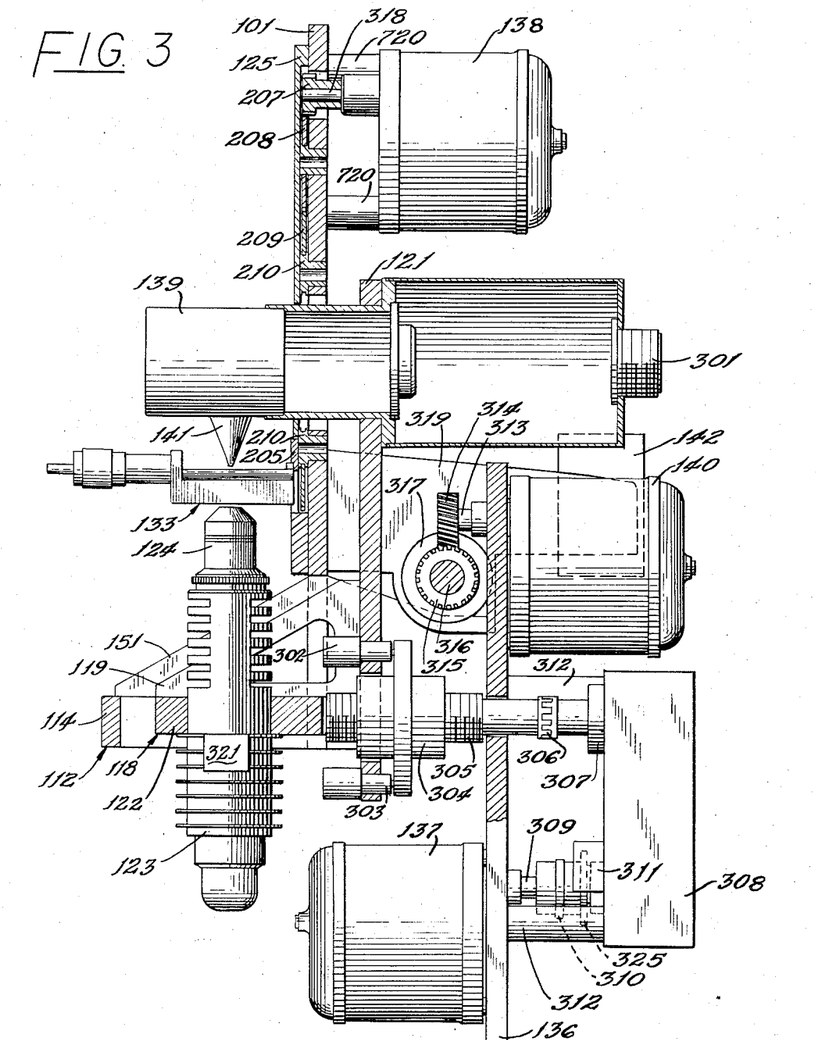
Fig. 3 is a side view of the scanning machine.

Referring to Figure 3, a partial cross-section view of the scanning machine is given to show a spatial relation and operational interplay between the various components comprising the film-scanning machine. The reversing motor 138 is used to drive an output shaft 318 on which is mounted the gear 207 as previously explained. The gear 207 cooperates with gear 208 to rotate the gear 209. The photomultiplier tube housing 139 comprises two sections, a small diameter section mounted on a larger diameter section. A light guide 141 is attached to a photomultiplier tube (not shown) within the housing 139. The large diameter section has at its base end, a connector 301 for the purpose of extending connections to the photomultiplier tube (not shown). The large diameter section of the tube housing 139 contains bleeder resistors used for obtaining proper dynode voltages. The photomultiplier tube housing 139 is attached by suitable means to the carriage back plate 121. Attached also to the carriage back plate 121 is the side plate 119 (side plate 120 is not shown) which supports the carriage assembly 118.

The channel-drive motor 137 is attached by suitable means to the motor support plate 136. The output shaft 309 of the channel-drive motor 137 extends through an opening in the motor support plate 136 and is coupled by means of a coupling 310 to a reducing gear box 308. The series reducing gear box 308 is attached by suitable means, such as a bracket 312, to the motor support plate 136. A channel-drive limit microswitch 311 is secured to the channel reducing gear box 308 and is in close proximity to the shaft 309 so that a cam 325 on said shaft will function to engage said microswitch. The microswitch 311 operates to open the power circuit to the channel-drive motor 137 after each complete rotation of the output shaft 309. The output end of the reducing gear box 308 consists of a shaft 307 which is coupled by means of a coupling 306 to a shaft end of a channel-drive lead screw 305. The threaded portion of the channel-drive lead screw 305 engages with the internal threaded portion of a channel-drive nut 304 and extends therethrough into the carriage assembly 118. The channel-drive nut 304 is secured by suitable means to a pair of inserts 302 and 303 which are fastened to the carriage back plate 121. Energization of the channel-drive motor 137 will cause rotary motion, on a reduced scale, to appear at the output shaft 307 of the reducing gear box 308 to rotate the channel-drive lead screw 305 thereby causing the carriage assembly 118 which is mounted on the carriage back plate 121 to move either one way or the other depending on the direction of rotation of the channel-drive motor 137.

The main drive motor 140 is mounted on the motor support plate 136. An output shaft 313 of said motor extends through the motor support plate 136 and has a gear 314 mounted at its extremity. The motor support plate 136 is attached by a pair of drive support plates, such as 319, to the supporting plate 101. Passing through both of the drive support plates (in this view only drive support plate 319 is shown) is a drive shaft 316 (cross-section) on which is mounted a right helical gear 315 which engages the gear 314 for transmitting motion therefrom to the drive shaft 316. The drive shaft 316 rotates within a pair of bearings, such as bearing 317 which is mounted in the drive support plate 319. The function of the main drive motor 140 is to actuate the drive shaft 316 to transmit motion simultaneously to the left and right drive rollers 131 and 132 (Fig. 2).

As indicated before, the microswitch 311 will function to open an electrical circuit to the channel-drive motor 137 after said motor has rotated the output shaft 309 one complete revolution. A microswitch 321 is mounted on one side of the carriage support 112. A counterpart of microswitch 321, namely 220 (Fig. 2), is mounted on the opposite side of the carriage support 112. The purpose of these microswitches is to open the circuit to the entire electrical system whenever the carriage assembly 118 moves to either one of its two extreme positions.

Figure 4:
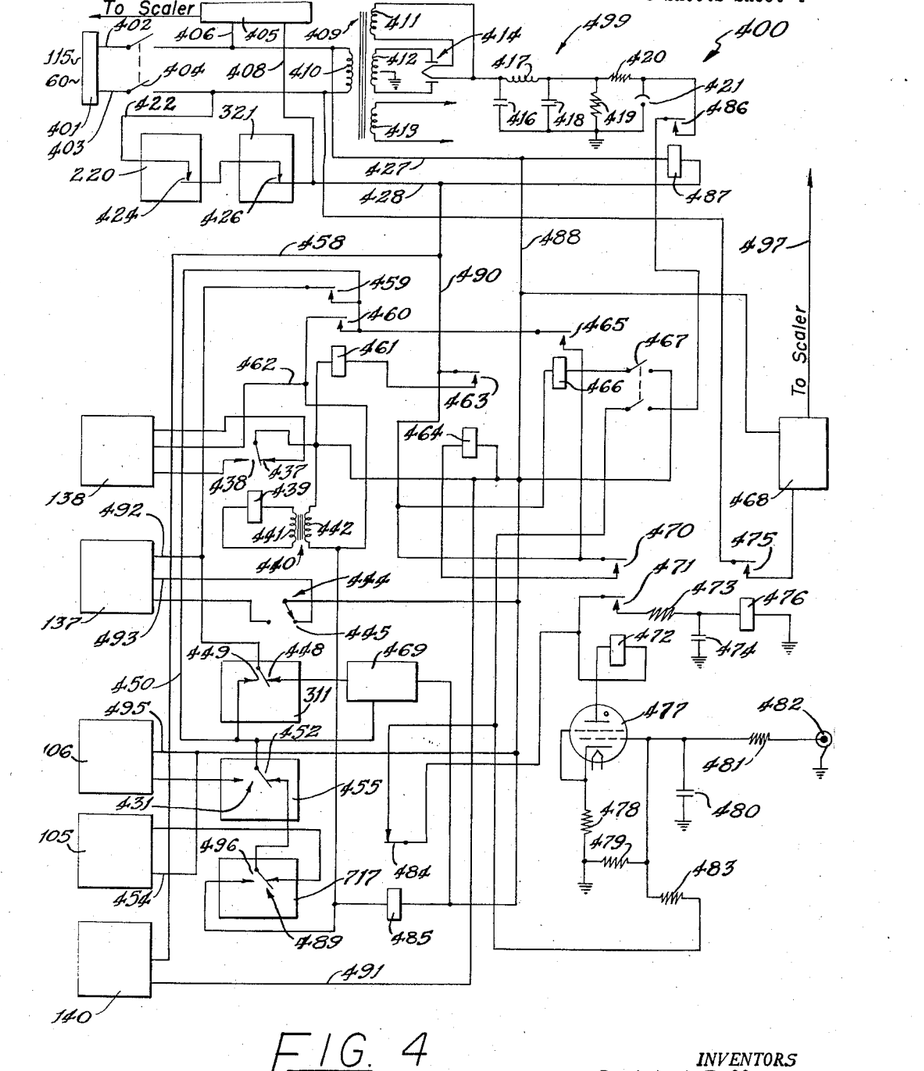
Fig. 4 is a schematic of an automatic control circuit utilized in conjunction with the scanning machine.

An automatic control circuit 400 is shown in Fig. 4. All the necessary components necessary for the automatic operation of the analyzer are shown in this circuit. A pair of leads 402 and 403 are connected to a source of power supply 401. A switch 404 is serially connected with the leads 402 and 403 to control the power supplied therethrough to a primary winding 410 of a transformer 409. A secondary winding 413 of the transformer 409 is used to supply filament power to a gas tube 477. A rectifier circuit, comprising a rectifier tube 414 and a filter 499, is used to provide a source of high positive potential for application to the plate of the gas tube 477. The rectifier tube 414 has its two plates connected across a secondary winding 412 which supplies a high voltage thereto. A secondary winding 411 supplies power to the filament of the rectifier tube 414. The filter 499 comprises resistors 419, 420, capacitors 416 and 418, and a choke coil 417. The filter 499 is a conventional filter of the choke-condenser type with a condenser input (pi-section). A resistor 420 is a series dropping resistor which provides the load impedance for a voltage regulating tube 421. Across the output of the filter 499 is connected a voltage regulating tube 421 and its series dropping resistor 420 to control the potential of the output. The function of the resistor 420 is to limit the amount of current flow during the period of conduction of the voltage regulator tube 421 thereby safeguarding it from possible damage. The application of a positive potential to the plate of the gas tube 477 is accomplished through a pair of contacts 486 controlled by a relay 487, through a pair of contacts of a switch 467, and through a set of contacts 484 controlled by a relay 485, and thereafter through a winding of a relay 472 which is in the plate circuit of the tube 477. A recorder 405 is connected across the power input via a set of contacts located in a pair of microswitches 321 and 220.

The power for the automatic operation of the analyzer is supplied to a series of motors such as the reversing motor 138, the channel-drive motor 137, the take-up motor 106, the take-up motor 105, and the main drive motor 140. The main drive motor 140 is supplied with power from the leads 402 and 403 via the microswitches 321 and 220. The microswitches 321 and 220 function to protect the whole system in case the film-scanning machine reaches one of its two-carriage operating limits. It should be noticed that the power connection from the lead 403 to the various components comprising the control circuit has to pass through both sets of the contacts of the microswitches 321 and 220. The take-up motor 106 will operate only when its associated reverse limit microswitch 455 is in an operated condition and microswitch 717 is in an unoperated condition. Similarly, the take-up motor 105 will operate only when its associated reverse limit microswitch 717 is in an operated condition and microswitch 455 is in an unoperated condition. Only one take-up motor can operate at any single instance since only one microswitch can be operated at any one time. The channel-drive motor 137 is protected by its associated channel-drive limit microswitch 311. The channel-drive motor 137 will not operate initially while its associated microswitch 311 is in the operated position, as shown, unless the open contacts 449 of the microswitch 311 are shunted by a set of contacts 459 of a relay 461, the operation of which will be described later. The reversing motor 138 is controlled by its associated reverse limit microswitches 717 and 455. Any one of these reverse limit microswitches in an operated position will prevent the reversing motor 138 from operating. The aforesaid reverse limit microswitches function to shut off the reversing motor 138 when it reaches one of its two extreme operating limits and to control the take-up motors 105 and 106.

A means 469 for dynamic braking is employed for preventing the coasting of the channel-drive motor 137 after said channel-drive motor has made one complete revolution of its output shaft. The channel-drive motor 137 possesses two motor windings, the midpoint of said windings being connected to a lead 492. The dynamic braking means 469 is connected through the contacts 448 of the channel-drive limit microswitch 311 to the midpoint of said motor windings. The other two outgoing connections from the dynamic braking means 469 are connected across the other two ends of the motor windings through the intermediary of various relay contacts.

A scaler clearing power 468 is connected directly to one side of the power input on lead 402 via leads 427 and 488, while the other side of the power input from the lead 403 is connected through a set of contacts 475 which are controlled by a relay 476. The scaler clearing power 468, upon being energized, will apply a particular potential to a lead 497 which connects to a scaler 603 so that the scaler can be reset for another counting operation. The relay 476 is under the control of the relay 472 which becomes energized whenever the gas tube 477 fires. A capacitor 474 connected across the winding of the relay 476 functions to make the relay operate and release at a slower rate.

The initiating component of the automatic control circuit 400 comprises the gas tube 477 having a plate, a screen grid, a control grid, a cathode and a filament. The screen grid is connected to the cathode. The cathode is connected to ground via a resistor 478. A source of positive potential is applied from the rectifier output through the contacts 486, one set of contacts on switch 467, a resistor 483, and resistor 479 to ground, the junction of resistors 479 and 483 being connected to the control grid. The grid of the tube 477 is also connected through a resistor 481 to a terminal 482. The terminal 482 is ordinarily connected to the photomultiplier unit 600. The grid of tube 477 is bypassed to ground by a capacitor 480 to shunt the pulses received at said terminal from the photomultiplier unit 600. A set of contacts 470 and 471 associated with the relay 472 control the operation of a pair of relays 464 and 476, respectively. As was stated before, the relay 476 controls the application of power to the scaler clearing power 468. A set of contacts 462 and 463 associated with the relay 464 is used to extend the power present on lead 490 to a set of contacts 459 and 460 which contacts are associated with a relay 461. The operation of the relay 461 is controlled by the energization of the relay 464. The operation of the relay 461 controls the application of power to the reversing motor 138 and the channel-drive motor 137; it also controls the operation of relays 439 and 485.

The winding of the relay 439 is connected across a secondary winding 441 of a transformer 440 which has the energization of its primary winding 442 controlled by the operation of the relay 461. The relay 439 functions to switch the connection on the reversing motor 138 so that the direction of the rotation of said motor can be controlled by switching to either one of its two motor windings.

The channel-drive motor 137 also possesses a pair of motor windings, as previously described, which make it possible to run said motor in either direction. The direction of the rotation of the channel-drive motor 137 can be controlled by means of a switch 444 which is manually operated to the desired position. The relay 485 has a heating element incorporated therein so that after said relay has been operated for an interval of time, its associated contacts 484 will not close immediately upon the release of said relay but will remain open for a short interval of time. The function of the relay 485 is to open up the energizing circuit to the gas tube 477, after the direction of the film feed has been reversed and the analyzer has been reset for a new counting operation, to prevent spurious recycling by the reversing strip until it has been wound up on a take-up reel.

Figures 5, 6, 8:
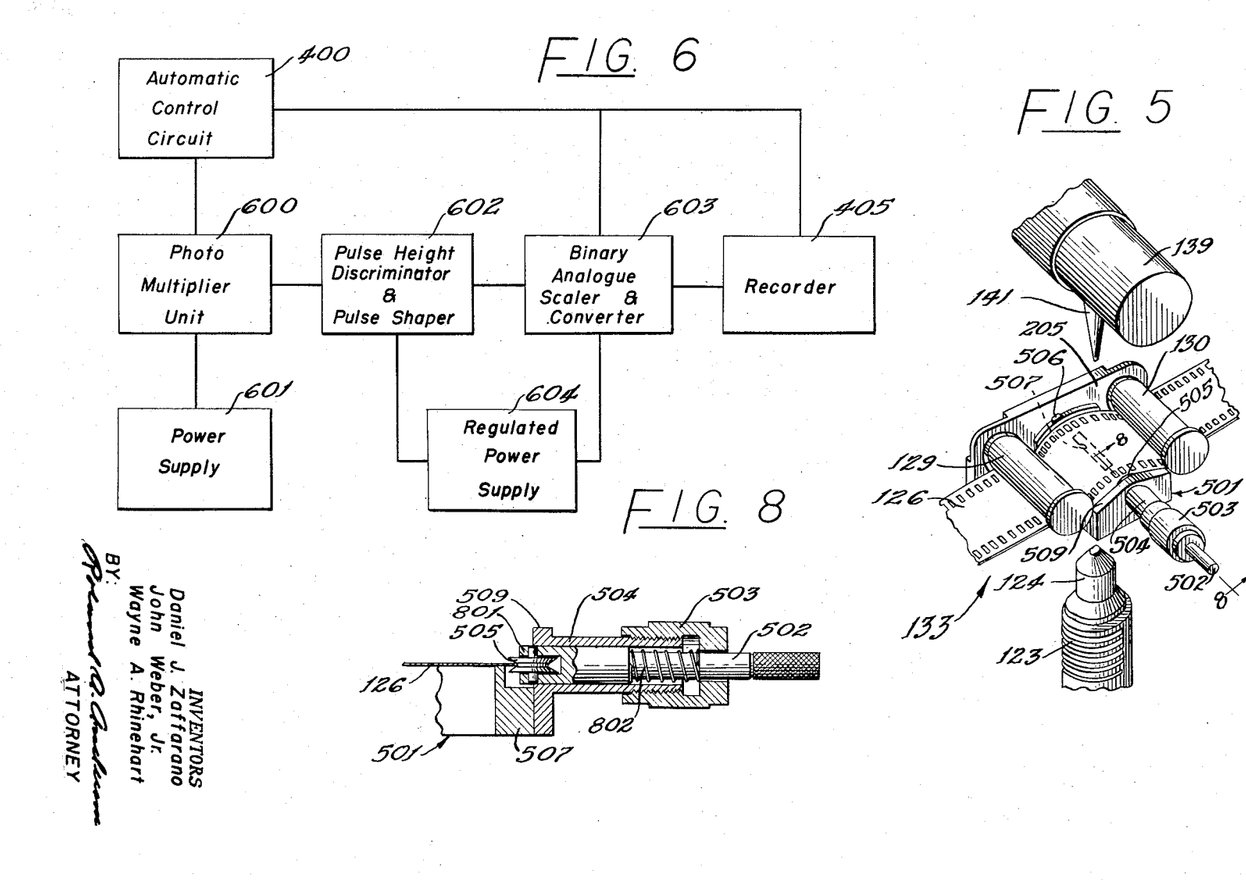
Fig. 5 is a perspective view of a film-guide assembly utilized in the scanning machine.
Fig. 6 is a block diagram depicting the various components comprising the analyzer.
Fig. 8 is a partial cross-sectional view of the film-guide assembly shown in Fig. 5 taken along the line "8—8."

The film-guide assembly 133 is shown in more detail in Fig. 5. A scanning head 501 is mounted on the film-guide base 205 by suitable means. One side of the scanning head 501 has an edge 509 for limiting the movement of the film strip 126. The other edge of the scanning head 501 possesses an anvil 506 so that the film strip 126 is constrained in lateral movement between said anvil 506 and the edge 509. In order to keep the film strip 126 form moving transverse to its direction of feed, a roller 505 is housed within the scanning head 501 and protruding slightly below the edge 509. This roller 505 is shaped like an ordinary pulley with its outer periphery possessing a groove therein to contain the edge of the film strip 128. This roller positions the film laterally and places it under tension of a spring (to be described in reference to Fig. 8) housed within a shank 504. A barrel 503 is threaded on the shank 504 to furnish a means for adjusting the compression of the spring housed within the shank 504. To facilitate the removal of the film strip 126 from the film-guide assembly 133, the compression which is exerted on the film strip by the roller 505 can be removed by pulling on the knob of the spring shaft 502.

A lamp of high brightness (not shown) contained within the light source housing 123 illuminates a juxtaposed aperture. An image of this aperture is formed by light which passes through the lens tube 124 and proceeds to go through a slot 507 contained within the scanning head 501, and thence to be directed by the plastic light guide 141 to be transmitted therethrough to the photomultiplier tube (not shown) located within the photomultiplier tube housing 139. Any obstruction found on the film strip 126, such as dots which correspond to electrical pulses previously recorded on the film, cause a variation in light intensity picked up by the lens 141 with a resultant variation in operation of the photomultipler tube. The film-guide rollers 129 and 130 force the film to follow the curvature of the scanning head 501, which is caused to be in an opposite sense to the natural curvature of the film due to volume shrinkage during the development process. This effectively strengthens the film at the point of constraint 506, permitting pressure to be applied by the roller 505 without inducing buckling of the film.

The various components which comprise the analyzer utilizing the photo-scanning machine described hereinbefore are illustrated in Fig. 6. The photomultiplier unit 600 which contains the scanning machine, the photomultiplier tube, and the light source is supplied by a power supply 601. The electrical circuit of the photomultiplier unit 600 is conected to the automatic control circuit 400 and also to a pulse-height discriminator and pulse shaper 602. A binary-analogue scaler and converter 603 is connected to the automatic control circuit 400, the recorder 405, as well as the pulse-height discriminator and pulse-shaper 602. The pulse-height discriminator 602 and the binary-analogue scaler and converter 603 are supplied with power from a regulated power supply 604. As the film strip is fed through the scanning machine, the dots in the channel which is being scanned, will cause positive output pulses to be generated by the photomultiplier tube and these pulses will be fed to the discriminator and pulse-shaping circuit 602 as well as to the control circuit 400. Only the pulses of sufficient magnitude will trigger the discriminator and this in turn will trigger a univibrator in the discriminator 602. The univibrator is used to give a uniform pulse in shape and height for firing the scaler stages of the binary-analogue converter 603. The univibrator is contained in the block form 602. The pulses transmitted by the pulse-height discriminator and pulse shaper 602 are added by the binary-analogue scaler and converter 603 and converted to D. C. voltages for application to the recorder 405. The deflection on the recorder 405 will be proportional to the total counts registered on the scaler 603.

Figure 7:
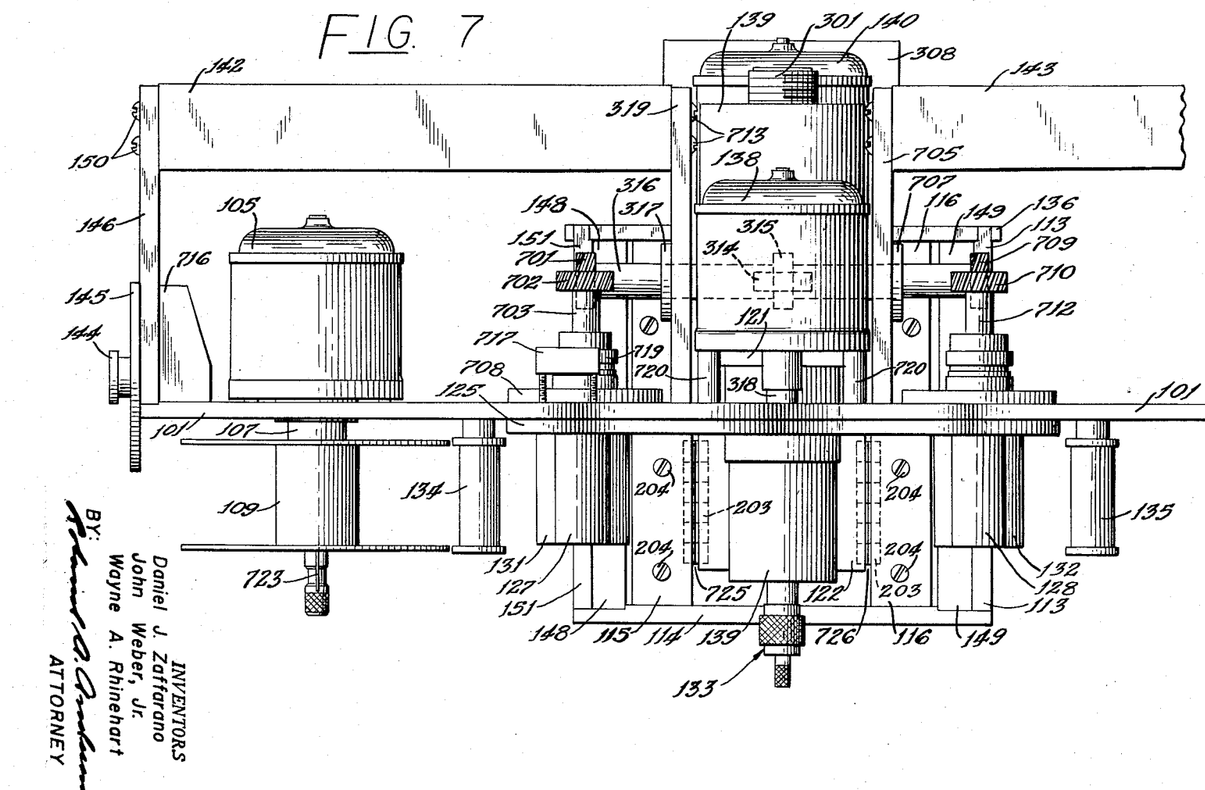
Fig. 7 is a top view of the scanning machine.

Fig. 7 represents the top view of the film-scanning machine 100 as shown in Fig. 2. The supporting plate 101, besides being attached at one end by means of the support lug 144, the end plate 145, the terminal support 146, and the screws 150 to the terminal panel 142, is additionally supported by the end brace 716. The end brace 716 keeps the supporting plate 101 from twisting about its main point of support at the lug 144. The opposite side of the supporting plate 101 is similarly mounted to the terminal panel 143 the means of which are not shown. The terminal panel 142 is firmly secured to the drive support plate 319 by means of screws 713.

The pressure roller 127 is mounted on one end of a shaft which is above and parallel to shafts 703 and 712. The shafts 703 and 712 operate the drive rollers 131 and 122. The shaft 703 is allowed to rotate within a bearing plate 708 which is mounted on the supporting plate 101. A cam 719 is firmly mounted on the pressure roller shaft. The cam 719 has a protuberance which engages with a contact (not shown) on a reverse limit microswitch 717 which operates to open the motor circuit of the reversing motor 138 whenever the extreme limit of travel of the pressure roller 127 is reached. A gear 702 is mounted at the other end of the shaft 703 to engage a left helical gear 701 which is mounted at one end of a drive shaft 316. The drive shaft 316 passes through the openings in the drive support plates 319 and 705. The other end of the drive shaft 316 has a right helical gear 709 mounted thereon. The right helical gear 709 engages a gear 710 to drive a shaft 712 on which the gear is mounted. The operation of the pressure roller 128 mounted on the shaft 712 is similar to that described for the pressure roller 127. Another right helical gear 315 is mounted in the middle of the drive shaft 316. The gear 315 engages the gear 314 as previously described in discussing Fig. 3.

The channel guide 116 passes under the supporting plate 101 and is fastened by suitable means to the motor support plate 136. The drive shaft 316 is enabled to rotate in the opening of the drive support plates 319 and 705 by means of a pair of bearings which are mounted within said drive support plates, such as bearings 317 and 707, as indicated by their flanges.

The reversing motor 138 is mounted on the supporting plate 101 by means of studs 720. A channel 726 separates the carriage bed 122 from the channel guide 116. A similar channel 725 is indicated on the other side of the carrage bed. The width of the channel 726 may be varied by adjusting the screws 204.

The take-up reel 109 which is mounted on the output shaft of the take-up motor 105 may be readily removed from the output shaft thereof by application of slight force to a spring, such as 723, located on said output shaft.

The internal structure of the film-guide assembly is revealed in a partial cross-section view (Fig. 8) of the assembly taken along the lines 8—8 in Fig. 5. A small amount of pressure is exerted on the edge of the film strip 126 by the roller 505. The roller is mounted within the housing 801 which is slidably mounted within the shank 504. The housing 801 has the spring shaft 502 in which is mounted a helical spring 802. The spring is constrained between the raised surface of the housing 801 and the inner surface of the barrel 503. The amount of compression placed on the spring 802 may be adjusted by selective threading of the barrel 503 on the shank 504. The film can be freed from its engagement with the roller 505 by pulling outward on the knurled portion of the shaft 502.

The method of automatic operation of the analyzer will now be described: The power switches on the various components shown in Fig. 6 are thrown to the "On" position and in particular the switches 404 and 467 as shown in Fig. 4. Power is supplied from a suitable source consisting of 115 volts, 60-cycle input over the lines 402 and 403 to the switch 404 to energize the primary winding 410 of the transformer 409. Closure of switch 404 establishes a power circuit to the recorder 405 which circuit extends from the line 406 through the recorder 405, line 408, contacts 426 of the "carriage out" microswitch 321, contacts 424 of the "carriage in" microswitch 220, and over line 422 to the line 403. The filament power to the tube 477 employed in the control circuit 400 is supplied by means of the secondary winding 413 of the transformer 409. The filament power to the rectifier tube 414 is supplied by the secondary winding 411 of the transformer 409. The high voltage impressed across the plates of the tube 414 is supplied by the secondary winding 412. The relay 487 is energized from the line 402, line 427, through the winding of the relay 487, and line 428 back to the line 403 via the contacts of the microswitches 321 and 220. The contacts 486 associated with relay 487 close to complete a circuit of positive potential to the impressed on the plate of the tube 477. The aforementioned circuit can be traced from the positive side of the rectifier through the contacts 486, one set of contacts of the switch 467, contacts 484, through the winding on relay 472 onto the plate of the tube 477.

Power is supplied to the take-up motor 105 over the following circuit: Lines 402, 427, 488, and 454, through winding on motor 105 and out over the line associated with the other terminal of the motor, contacts 489 of the reverse limit microswitch 717, to the set of contacts 452 of the reverse limit microswitch 455, through contacts 465 of the relay 466, over line 490 and through the contacts 426 and 424 of the microswitches 321 and 220, respectively, to the line 403. The main drive motor 140 is energized from line 402 over the line 488, line 491, through the winding of the main drive motor 140, out over line 458, line 490, contacts 426 and 424, and over line 422 to the line 403. It is to be remembered that in the operation described up to the present time, it was assumed that certain of the microswitches were open and that others were closed. The microswitches 717 and 311 are operated (as shown in the Fig. 4); the other microswitches 220, 321 and 455 are not operated.

The relays and the microswitches that have been described are in a certain position so that the film strip 126 is driven to the left as viewed on Fig. 1 and Fig. 2. At this stage, the main drive motor 140 and the take-up motor 105 are being operated. The microswitches 311 and 717 are also in the operated state together with the relay 487 and relay 466.

As stated before, with the conditions existing as described, the direction of the film feed will be to the left. Dots on the film in the channel being scanned will cause positive output pulses from the photomultiplier unit 600 to be transmitted to the automatic control circuit 400 to the terminal 482. The pulses, being fed to the control circuit over the terminal 482, pass through the resistor 481 and are by-passed to ground by means of the capacitor 480. The tube 477 is in the cut-off condition due to the negative output voltage from the photomultiplier unit 600 when excited by the light source. It is to be noted that a D. C. coupling is used in this circuit.

This operation will continue with the pulses being counted by the binary-analogue scaler 603 until such time as a reversing strip on the film is reached. The reversing strip is approximately a 12-inch length of the film which has been rendered opaque by some method so that all light is obstructed from the photomultiplier tube view. One method of doing this is to paint the film with optical black paint for the 12-inch reversing strip. When this strip is reached, the photomultiplier does not see any light and therefore its D. C. output voltage at the anode rises nearly to ground potential. This allows the bias on the tube 477 to rise to a firing potential thereby initiating a reversing cycle.

Since the reversing cycle is composed of a series of sequential operations, the following description of the total operation will be subdivided into time segments, as follows:

Time: 0 plus

Tube 477 fires, when its grid becomes more positive, and conducts over the following circuit: Ground, resistor 478, the interelectrode space between the cathode and the plate of the tube 477, winding of the relay 472, contacts 484, one set of contacts on switch 467, and through the contacts 486 to the source of rectified positive potential.

As a result, relay 472 operates and closes its contacts 470 and 471 to operate relay 464 and to operate the one-second delay relay 476, respectively. A circuit is established for the relay 464 from the line 402, over line 488, winding on relay 464, contacts 470, line 490, line 428, contacts 426 and 424, and line 422 to line 403. The contacts 463 close an energizing circuit to relay 461 which circuit extends from the line 402, line 488, winding of the relay 461, contacts 463, line 490, line 428, contacts 426 and 424, and over the line 422 to the line 403.

As a result of the operation of relay 461, the contacts 459 become closed and establish a circuit to the channel-drive motor 137 which circuit extends from the line 402, line 488, contacts 445, lead 493, through a winding of the channel-drive motor 137, lead 492, contacts 459, contacts 465, lead 490, lead 428, contacts 426 and 424, and lead 422 to the lead 403. As can be seen from the circuit, the function of the contacts 459 is to shunt the contacts 449 on the channel-drive limit microswitch 311 which contacts are open at this particular sequence of operation. It should be recalled that the function of the channel-drive limit microswitch 311 is to open the circuit of the channel-drive motor after a new channel has been traversed by the photo-multiplier assembly. The contacts 460 close and establish an initial circuit to the reversing motor 138 which circuit extends from the lead 402, lead 427, over lead 488, contacts 438 (the relay 439 having been operated, as will be described hereinafter), one set of motor windings in the reversing motor 138, out over the lead 462, contacts 460, contacts 465, lead 490, contacts 426 and 424, and over lead 422 to the lead 403. After the reversing motor has operated for a short interval of time, the reverse limit microswitch 717 now becomes inoperated so that another power circuit exists to the reversing motor 138 from the leads 402, 427, 488, contacts 438, winding on the motor 138, lead 462, contacts 496 and 452, lead 450, contacts 465, lead 490, contacts 426 and 424, and leads 422 and 403. The contacts 460 also complete a circuit to the primary winding 442 which circuit extends from the lead 402, lead 427, lead 488, the primary winding 442 on the transformer 440, contacts 460, contacts 465, lead 490, lead 428, contacts 426 and 424, and over the lead 422 to the lead 403. Energization of the primary winding 442 of the transformer 440 causes the relay 439 to operate since it is connected across the secondary winding 441 of said transformer. The relay 439 is of the type that always has one set of its contacts closed at all times. Energization of this relay will cause the closed set of contacts, such as contacts 437, to open, and will cause the open set of contacts, such as 438, to close. A closed set of contacts will remain in such a state even though the relay becomes deenergized. In consequence of the operation of the relay 439, the contacts 437 open up and the contacts 438 close to establish a circuit to the reversing motor 138 which circuit was described hereinbefore.

At this stage of the operation, the reversing motor 138, the channel-drive motor 137, the take-up motor 105 and the main drive motor 140 are operating. After a short period of running, as was stated hereinbefore, the reversing motor 138 causes the microswitch 717 to become inoperated thereby opening the power circuit to the take-up motor 105.

As shown in Fig. 2, just before the reversing cycle was initiated, the film strip 126 was being fed to the left by means of frictional force applied to it by the drive roller 131 which cooperated with the pressure roller 127 to keep the film strip under proper tension. The take-up reel 109 was rotated by the take-up motor 105 in counterclockwise direction, as shown, to take up the film strip 126 fed to the left.

After the reversing cycle has commenced and the energization of the reversing motor 138 has been established, the reversing motor 138 will rotate the gear 207 in a counterclockwise direction resulting in the rotation of the annular gear 209 also in the counterclockwise direction. The gear 209 causes a gear, behind the cover plate 125, the position of said gear being indicated by the dashed circle 227, to rotate in a clockwise direction. As a result, the pressure roller 127, which is eccentrically mounted on the shaft supporting the gear in question, is made to revolve also in the clockwise direction. The revolution of the pressure roller 127 about its mounting axis causes the pressure roller to be lifted off its pressure contact with the drive roller 131 to thereby remove the pressure previously exerted upon the film strip 126.

At the same time, the gear 209 causes the gear 217 to rotate in a clockwise direction with the result that the pressure roller 128 is made to revolve in similar manner. The revolution of the pressure rollers 128 causes it to descend until it comes into pressure contact with the drive roller 132 with the film strip 126 therebetween. As a result, the film is fed now to the right and is taken up by the other take-up reel, namely 110.

Time: 1.0 second

As indicated before, after an interval of one second has elapsed, the relay 476 is operated over the following circuit: From the positive side of the rectifier output through the contacts 486, one set of contacts on the switch 467, contacts 484, contacts 471, resistor 473, and through the winding on relay 476 to ground. The energization of relay 476 is responsible for the closure of contacts 475 which allow power to be applied over said contacts to the scaler clearing power 468 over an obvious circuit. As a result, the scaler clearing power 468 operates and causes a proper voltage to be impressed on its outgoing lead 497 which is connected to the scaler 603 (Fig. 6). As indicated before, the function of the scaler 603 is to count the number of pulses initiated by the photomultiplier unit 600. The voltage impressed upon the scaler 603 causes it to become conditioned for a new counting operation whenever the cycle is reversed.

Time: 2.0 seconds

The relay 485, which has power supplied to it whenever the reversing motor 138 is running, now operates and its contacts 484 open up. The reason relay 485 operates only when the reversing motor 138 is running is that the relay 485 is connected in parallel with the reversing motor 138. The contacts 484 open and break the energizing circuit to the gas tube 477 which circuit was previously described. The opening of the contacts 484 is also responsible for the deenergization of the relay 472. The contacts 470 of the relay 472 open up the energizing circuit to the relay 464. The contacts 471 open the energizing circuit, previously described, to the relay 476.

The relay 464 releases and consequently opens its contacts 463, which are responsible for the deenergization of the relay 461. The release of the relay 461 is responsible for the opening of the contacts 459 and 460. The opening of the contacts 459 removes the power connection, previously described, to the microswitch 311.

At this stage of operation, the channel-drive motor 137, the reversing motor 138, and the main drive motor 140 are running. It should be recalled that the channel-drive motor 137 will continue to run and actuate the photomultiplier assembly until a new channel on the film is in position to be scanned. Also, the reversing motor 138 will keep on operating until its operating limit is reached, i. e., when the pressure roller 128 comes in pressure contact with the drive roller 132.

*Time: 2.6 seconds*

Channel-drive motor 137 has now completed one revolution of its output shaft and has moved the light carriage assembly 118 and photomultiplier tube housing 139 by 0.005 inch in this embodiment. As a result, the analyzer is in a position to count the dots in the next channel on the film. The channel-drive motor, after traversing to the new channel, now operates the channel drive limit microswitch 311 to open the contacts 449 thereby turning itself off. The contacts 448 of the microswitch 311 are then closed thereby putting across the motor circuit the dynamic braking unit 469 which is used to brake the channel-drive motor 137 after it has been deenergized.

*Time: 3.0 seconds*

At this time, the slow-release relay 476 releases and opens its contacts 475 to remove thereby the application of a clearing voltage to the scaler 603 by deenergizing the scaler clearing power 468. The recorder 405 is now set to begin counting the dots found in the new channel. The time lag of the relay 476 was achieved by shunting the winding of said relay by the capacitor 474.

*Time: 5.0 seconds*

The pressure roller 128 engages the drive roller 132; and the cam 727, on the shaft 712 which supports the pressure roller 128, operates a reverse limit microswitch 455 (which occupies a position similar to microswitch 717 but on the right side of the scanning machine) which stops the reversing motor 138 by opening the contacts 452 and applies power to the take-up motor 106 by closing the contacts 431. Up to the present time, the reversing motor 138 has been energized by power received from lead 402, lead 427, lead 488, contacts 438, winding on motor 138, lead 462, contacts 496, contacts 452, lead 450, contacts 465, lead 490, lead 428, contacts 426 and 424, and over lead 422 to the lead 403. The energizing circuit to the take-up motor 106 extends from the lead 402, lead 427, lead 488, lead 495, the winding on the motor 106, contacts 431, lead 450, contacts 465, lead 490, lead 428, contacts 426 and 424 and lead 422 to the lead 403. As a result, the take-up motor 106 operates and applies tension via the take-up reel 110 to the film strip 126 to take up the film which is now being driven to the right by means of the drive roller 132 cooperating with the pressure roller 128. The film now moves to the right and a new cycle is started.

The thermal relay 485 is deenergized but its contacts 484 will not close for a few seconds until the heater element mounted on the relay cools off. This allows time for the film strip 126 to move so that the reversing strip, that is the opaque portion of said film strip, is no longer obstructing the light from the view of the photomultiplier tube and thereby preventing the gas tube 477 from starting another reversing cycle prematurely.

The above procedure is followed at the end of each cycle until such time when either of the carriage limit microswitches 220 and 321 is operated to turn off the analyzer. It is to be remembered that the various components shown in the automatic control circuit 400 and described hereinbefore are connected to the lower side of the power supply, namely, line 403, through the contacts 426 and 424 of the carriage limit microswitches 220 and 321, respectively.

While there has been described what is at present considered to be the preferred embodiment of the invention, it will be understood that various modifications may be made therein and it is intended in the appended claims to cover all such modifications as found within the true spirit and scope of the invention.

What is claimed is:

1. A device for scanning information on a multichannel record member, said device comprising a photo-optical means for reading information on the record member, means for moving the record member longitudinally past the photo-optical means in forward and backward directions, means for moving the photo-optical means laterally upon completion of each longitudinal movement of the member to read a different channel, means for converting the scanned information into signals, and means for confining the record member laterally during the longitudinal movement, whereby the machine scans only one channel at a time to convert the scanned information into signals which may be counted and recorded.

2. The device as claimed in claim 1, wherein the means for moving the record member longitudinally past the photo-optical means comprises a pair of oppositely mounted drive rollers, a pair of take-up motors having output shafts, a take-up reel mounted on each output shaft, a drive motor adapted to drive said drive rollers, a pair of pressure rollers mounted on individual shafts, each pressure roller associated with a drive roller and cooperatively adapted to engage the record member therebetween to control the longitudinal movement of the record member, means adapted to change alternately the cooperation of said pressure rollers with said drive rollers, and control means, after a particular channel has been read, to control the operation of said changing means and said take-up motors whereby the direction of the movement of the record member is reversed.

3. The device as claimed in claim 1 wherein the means for moving the photo-optical means laterally upon completion of each longitudinal movement of the member comprises a carriage, said photo-optical means mounted on said carriage, a channel motor adapted to actuate said carriage, and control means to actuate said channel motor in response to the longitudinal limit of travel of said record member.

4. The device as claimed in claim 1 wherein the photo-optical means is associated with a control circuit, said photo-optical means responsive to the scanned information to transmit pulses to said control circuit, said control circuit responsive to the receipt of said signals to coordinate said moving means.

5. A film-scanning machine for reading the number of events recorded on a multichannel film comprising a light source producing a small, well-defined illuminated area, a film-guide assembly for positioning and constraining the film over said illuminated area, means responsive to variations in the light transmitted by the film in said illuminated area caused by variation in film density to generate a signal, means for driving the film longitudinally past said illuminated area to actuate the signal generating means, and means responsive to the longitudinal limit of travel of any scanned channel on said film to shift the light source and the light responsive means laterally to another channel on the film and to reverse the longitudinal movement of said film whereby said machine converts each event into a signal capable of being counted and recorded.

6. A film-scanning machine for a radiation energy measurement system comprising a light source producing a beam, a light responsive transducer positioned to be activated by the beam to produce a signal, means for feeding a film to be scanned longitudinally between the source and the transducer so that a portion of the width of the film intercepts said beam, said film having a variable light density corresponding to intelligence recorded thereon, means responsive to completion of such feeding in any one direction to reverse the direction of feed, and means coupled to said reversing means to change the transverse portion of the film intercepting the beam, whereby the operation of said last means is initiated by the actuation of the reversing means thereby enabling the machine to produce signals corresponding to radiation energy information recorded on the film, said signals being available for counting and recording.

7. A film-scanning machine for reading the number of events recorded on a multichannel film strip comprising a supporting plate having vertical and horizontal extremities, a take-up motor mounted on each horizontal extremity of said plate, a take-up reel mounted to each motor and adapted to cooperate with the other reel for winding the film strip stretched therebetween, a film-guide assembly mounted on said supporting plate and adapted to engage said stretched film, a carriage assembly including a carriage bed mounted on said supporting plate, a source of light producing a beam, said source of light mounted on said carriage bed, a motor support plate mounted on said supporting plate, a channel motor mounted on the motor support plate and adapted to move said carriage bed including the light source transversely to the stretched film strip, a pair of drive rollers, a drive motor adapted to drive said drive rollers, a pair of pressure rollers mounted eccentrically on individual shafts, each pressure roller cooperating with its associated drive roller to engage the film therebetween, each pair of said rollers adapted to move the film strip in a predetermined direction past the light source, means responsive to the light beam variations caused by film density variatons to produce a signal, a reversing motor adapted to actuate said shafts and the pressure rollers mounted thereon, said stretched film strip being positioned over said film-guide assembly between said source of light and the light responsive means, and control means to control the operation of said reversing motor, said reversing motor responsive to said control to actuate the engagement of the film between said rollers to move the film in longitudinal direction, said control means responsive to the longitudinal limit of travel of said film to actuate said channel motor, said channel motor being effective to move the carriage bed including the light source to a different position to scan another channel on said film, whereby said machine scans the entire film strip and converts the events into signals which can be counted and recorded.

8. The device as claimed in claim 7 wherein the film-guide assembly comprises a flat rectangular base, a pair of rollers mounted along one side of said base, a recessed scanning head adapted to engage substantially the full width of the film strip, said scanning head mounted on the base slight below and between said rollers and adapted to constrain the film strip between itself and said rollers to prevent channel variations, and means on said scanning head to control the lateral displacement of the film during its longitudinal movement.

9. The device as claimed in claim 8 wherein the scanning head has convex sliding surface adapted to engage in opposition to the convex surface of the film strip so that the transverse curl ordinarily present in the film strip is flexed outward to conform to the convex surface of the sliding surface thereby eliminating contact deviations of said film strip on the scanning head.

10. A device for reading out the information stored on a recording medium, said device comprising a photo-optical assembly, a guide assembly for positioning the recording medium in said photo-optical assembly, means in said photo-optical assembly for focusing a beam of light on said recording medium, other means in said photo-optical assembly for detecting light intensity variations of said beam passing through said recording medium and to transform said variations to an output, means for moving said recording medium longitudinally through said guide assembly past the light beam to effect an output corresponding to film density variations, other means to move the photo-optical assembly laterally with respect to the recording medium, and a control circuit connected to said output, said control circuit responsive to certain variation in said output to reverse the direction of movement of said recording medium through said guide assembly and to energize said other means to move the photo-optical assembly a predetermined distance to thereby scan another portion of said recording medium, whereby said device converts the information into an output which can be analyzed.

11. The device as claimed in claim 8 wherein said guide assembly comprises a scanning head adapted to position the recording medium in an intercepting relation to the light beam, a shank attached to said head, a compression means comprising a helical spring, barrel, and shaft, the barrel threaded on said shank, said helical spring mounted on said shaft and housed within the shank, a pulley mounted on one end of said shaft adapted to engage the side of the recording medium, said spring cooperating with said shaft and said barrel to exert a compressive force through said pulley on said recording medium to thereby restrict the lateral movement of said recording medium, said shaft adapted to be withdrawn to relieve the engagement of the pulley with the recording medium to facilitate the removal of the recording medium positioned in said scanning head.

References Cited in the file of this patent

UNITED STATES PATENTS

| | | |
|---|---|---|
| 1,918,102 | Hewlett | July 11, 1933 |
| 2,196,730 | Hooker | Apr. 9, 1940 |